US008915680B2

(12) United States Patent
Divine et al.

(10) Patent No.: US 8,915,680 B2
(45) Date of Patent: Dec. 23, 2014

(54) TOOL PROTECTION DEVICES

(75) Inventors: Michael Wayne Divine, Georgetown, KY (US); Bryan E. Berryhill, Georgetown, OH (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1119 days.

(21) Appl. No.: 12/895,917

(22) Filed: Oct. 1, 2010

(65) Prior Publication Data

US 2012/0079924 A1 Apr. 5, 2012

(51) Int. Cl.
*B23G 1/28* (2006.01)
*B23G 1/46* (2006.01)
*B25G 1/04* (2006.01)

(52) U.S. Cl.
CPC .................................... *B25G 1/043* (2013.01)
USPC .......... 408/187; 408/236; 408/238; 81/177.7; 81/489; 248/652; 248/666

(58) Field of Classification Search
USPC ............. 408/186, 187, 234, 236, 238, 239 R; 81/177.7, 177.75, 489; 7/167, 168; D08/107, 306; 248/291.1, 292.12, 248/309.1, 315, 652, 666; 470/198
IPC ....................................... B23G 1/28,1/46, 1/48
See application file for complete search history.

(56) References Cited

U.S. PATENT DOCUMENTS 100,772 A 3/1870 Kelly
101,466 A * 4/1870 Hunter .......................... 408/138
458,581 A * 9/1891 Johnson .......................... 408/64
617,462 A * 1/1899 Davis ................................ 7/140
654,010 A * 7/1900 Lamberg ....................... 408/236
672,284 A * 4/1901 Nuttall .......................... 408/138
757,950 A 4/1904 McElwain et al.
1,068,170 A * 7/1913 Royce .......................... 408/236
2,671,667 A 3/1954 Flory
3,083,593 A 4/1963 Cotter
3,640,635 A 2/1972 VonHollen
4,118,141 A * 10/1978 Spohn, Jr. ....................... 408/90
4,375,341 A 3/1983 Schulze
4,468,159 A * 8/1984 Oster ............................. 408/56

(Continued)

FOREIGN PATENT DOCUMENTS

CN 201960231 U * 9/2011
JP 2011136379 A * 7/2011
JP 2012011491 A * 1/2012

*Primary Examiner* — Eric A Gates
(74) *Attorney, Agent, or Firm* — Dinsmore & Shohl LLP

(57) ABSTRACT

A hand-held tool protection device includes a handle sized and configured to be grasped by an operator. A neck portion extends outwardly from the handle in a direction of a elongated axis of the handle. A swivel assembly is connected to the neck portion. The swivel assembly includes a body having a top, a bottom and a sidewall. The body is connected to the neck portion at the sidewall of the body. An opening extends through the body and intersects the top and the bottom of the body. A pivotable rod member is slidably and pivotably received in the opening extending through the body to provide a pivot axis. A tool element holding assembly is connected to the pivotable rod member such that the tool element holding assembly pivots therewith about the pivot axis. The tool element holding assembly includes a support assembly configured for receiving a tool such that the tool may be rotated about a tool rotation axis.

15 Claims, 6 Drawing Sheets

(56) References Cited

U.S. PATENT DOCUMENTS

| | | | | |
|---|---|---|---|---|
| 4,494,895 | A * | 1/1985 | Leaf | 408/236 |
| 5,971,677 | A * | 10/1999 | Lan | 408/236 |
| 6,705,921 | B1 * | 3/2004 | Shepherd | 451/2 |
| 7,488,327 | B2 | 2/2009 | Rathbun | |
| 2007/0041799 | A1 | 2/2007 | Schaefer et al. | |

* cited by examiner

TOOL PROTECTION DEVICES

TECHNICAL FIELD

The present specification generally relates to tool protection devices for hand-guided rotating tools.

BACKGROUND

In the manufacturing of automobiles on an assembly line, there are many repetitive process steps. Some of the process steps are performed manually using a variety of tools. When products are manually assembled, it may be somewhat difficult to accurately align the various tools for machining or fastening processes. Incorrect alignment of tools during machining or fastening processes can result in a variety of conditions, such as cross-threading. In many instances, an automobile must be taken off-line and repaired if a cross-threading condition occurs, which causes delay in vehicle production.

SUMMARY

In one embodiment, a hand-held tool protection device includes a handle sized and configured to be grasped by an operator. A neck portion extends outwardly from the handle in a direction of a elongated axis of the handle. A swivel assembly is connected to the neck portion. The swivel assembly includes a body having a top, a bottom and a sidewall. The body is connected to the neck portion at the sidewall of the body. An opening extends through the body and intersects the top and the bottom of the body. A pivotable rod member is slidably and pivotably received in the opening extending through the body to provide a pivot axis. A tool element holding assembly is connected to the pivotable rod member such that the tool element holding assembly pivots therewith about the pivot axis. The tool element holding assembly includes a support assembly configured for receiving a tool such that the tool may be rotated about a tool rotation axis.

In another embodiment, a hand-held tool protection device includes a tubular housing body that is graspable by an operator having a first end bore, a second end bore and an interconnecting bore extending between the first end bore and the second end bore. A tool assembly extends from the first end bore, through the interconnecting bore and into the second end bore. The tool assembly includes a tool comprising a tool holder located at the first end bore, a spring located between the tool holder and the interconnecting bore and a tap portion located at the second end bore. The spring biases the tool toward a retracted position.

In another embodiment, a hand-held tap protection device includes a handle sized and configured to be grasped by an operator. A neck portion extends outwardly from the handle in a direction of an elongated axis of the handle. A swivel assembly is connected to the neck portion. The swivel assembly includes pivot structure having a pivot axis. A tool element holding assembly is connected to the pivot structure such that the tool element holding assembly pivots therewith. The tool element holding assembly includes a support assembly configured for receiving a tap such that the tap may be rotated about a tool rotation axis.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to tool protection devices for insulating an operator from a rotating tool element. The tool protection devices may be hand-held and used as the operator manually guides the tool element to a work location while the tool element is not rotating. The tool protection devices may also be used as the tool element rotates during operation, which can inhibit contact between the rotating tool element and the operator.

Figure 1:
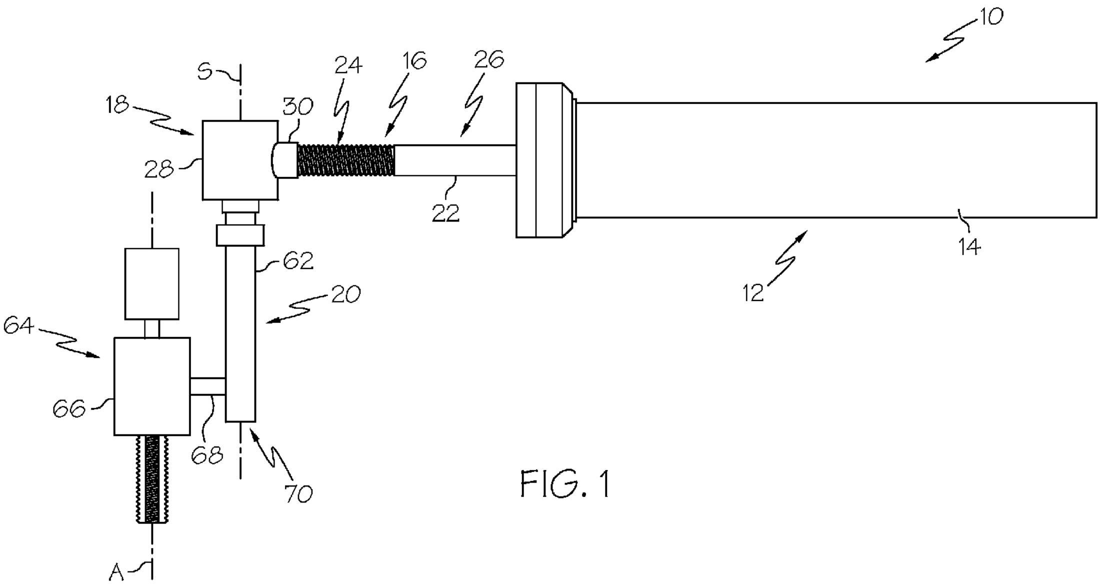
FIG. 1 is a side view of a tool protection device according to one or more embodiments described herein.

Referring to FIG. 1, an exemplary embodiment of a hand-held tool protection device 10 includes a handle portion 12 including a handle 14, a neck portion 16, a swivel assembly 18 and a tool element holding assembly 20. The handle 14 is sized and configured to allow the operator to grasp and hold the tool protection device 10 and is connected to the swivel assembly 18 by the neck portion 16. In the illustrated embodiment, the neck portion 16 is formed by a relatively straight rod 22 having a threaded portion 24 and a smooth portion 26. In other embodiments, the rod 22 may have a shape other than straight, such as including one or more bends or curved portions. The neck portion 16 may have a cross-section dimension that is less than the handle 14, however, other configurations are contemplated.

Figure 2:
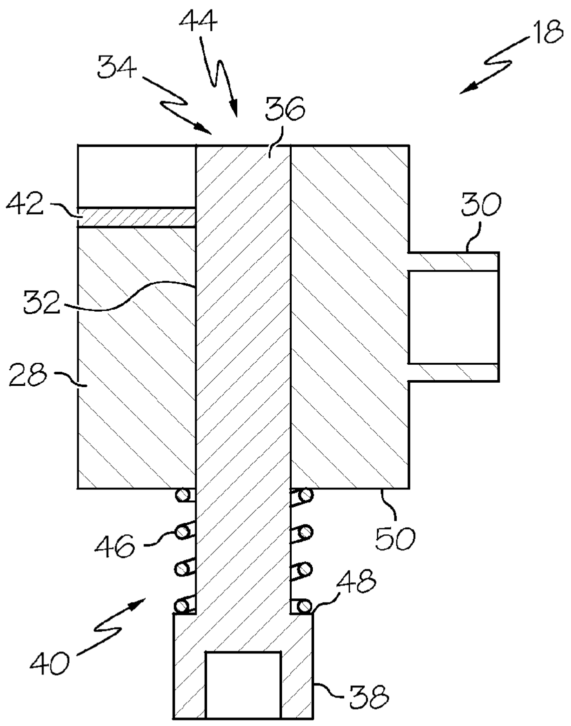
FIG. 2 is a section view of a swivel assembly for use with the tool protection device of FIG. 1 according to one or more embodiments described herein.

The swivel assembly 18 is threadably connected to the threaded portion 24 of the rod 22. In other embodiments, the swivel assembly 18 may be connected to the rod 22 using any other suitable connection, such as by welding, adhesive, etc. Referring also to FIG. 2, the swivel assembly 18 includes a body 28 including a connector arm 30 for connecting the swivel assembly 18 to the rod 22 and a bore 32 extending vertically through the body 28 and substantially perpendicular to the connector arm 30 that is sized to slidably receive a vertically oriented swivel attachment assembly 34. The swivel attachment assembly 34 includes a rod member 36 that is slidably and rotatably received in the bore 32 and a vertical arm attachment 38 that is located at an attachment end 40 of the rod member 36. A latch pin 42 (e.g., a fastener) is located at an upper end 44 of the rod member 36. The latch pin 42 extends outwardly from and substantially transverse to the rod member 36. A spring 46 or other suitable biasing member is located about the rod member 36 and between an upper surface 48 of the vertical arm attachment 38 and a bottom surface 50 of the body 28. The spring 46 is used to bias the swivel attachment assembly 34 toward the illustrated latched position.

Figure 3:
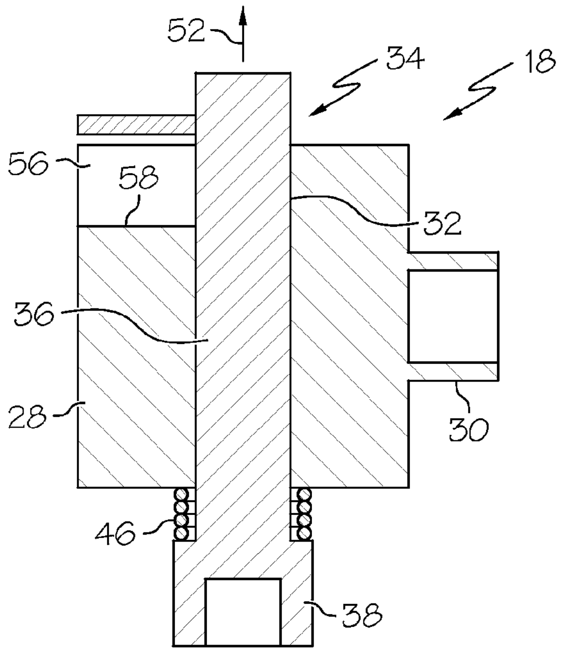
FIG. 3 is another section view of the swivel assembly of FIG. 2 according to one or more embodiments described herein.
Figure 4:
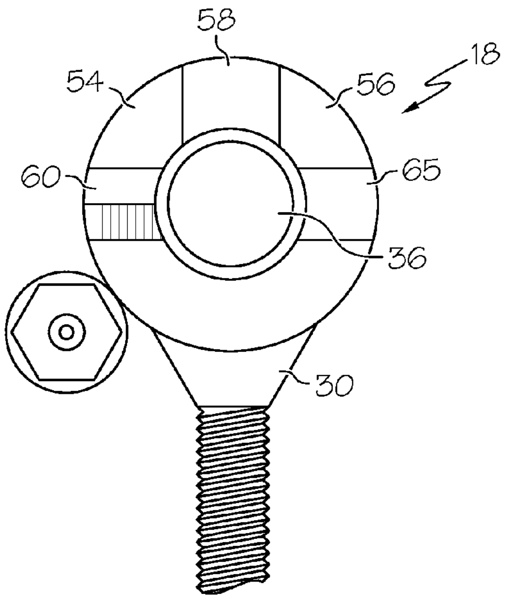
FIG. 4 is a top, partial view of the tool protection device of FIG. 1 according to one or more embodiments described herein.

Referring to FIGS. 3 and 4, the swivel attachment assembly 34 can be moved (e.g., manually) in the direction of arrow 52 toward an unlatched position. In the unlatched position, the latch pin 42 is located above adjacent rotation limiting elements 54 and 56 that extend outwardly above a valley surface 58 between the two rotation limiting elements 54 and 56. In this unlatched position as shown by FIGS. 3 and 4, the swivel attachment assembly 34 can be rotated (e.g., 25 degrees or more, such as 45 degrees or more, such as 90 degrees or more, such as 180 degrees) to a second latched position above valley surface 60. In some embodiments, there may be three or more discrete latched positions. For example, FIG. 4 shows three different and discrete latched positions that are located at valley surfaces 58, 60 and 65. Operation of the tool protection device will be described in greater detail below.

Referring back to FIG. 1, the tool element holding assembly 20 includes a vertically oriented rod 62 that extends substantially parallel to the rod member 36 and downwardly below the swivel assembly 18. A first end of the rod 62 is received within the vertical arm attachment 38. The rod 62 may be affixed to the swivel assembly 18 using any suitable means, such as adhesive, threads, welding, etc. Connected near an opposite end 70 of the rod 62 is a tool holding assembly 64. The tool holding assembly 64 includes a support assembly 66 and a horizontally oriented connecting rod 68 that extends substantially perpendicular to the rod 62 and offsets the support structure 66 from the rod 62 in a direction transverse the length of the rod 62.

Figure 5:
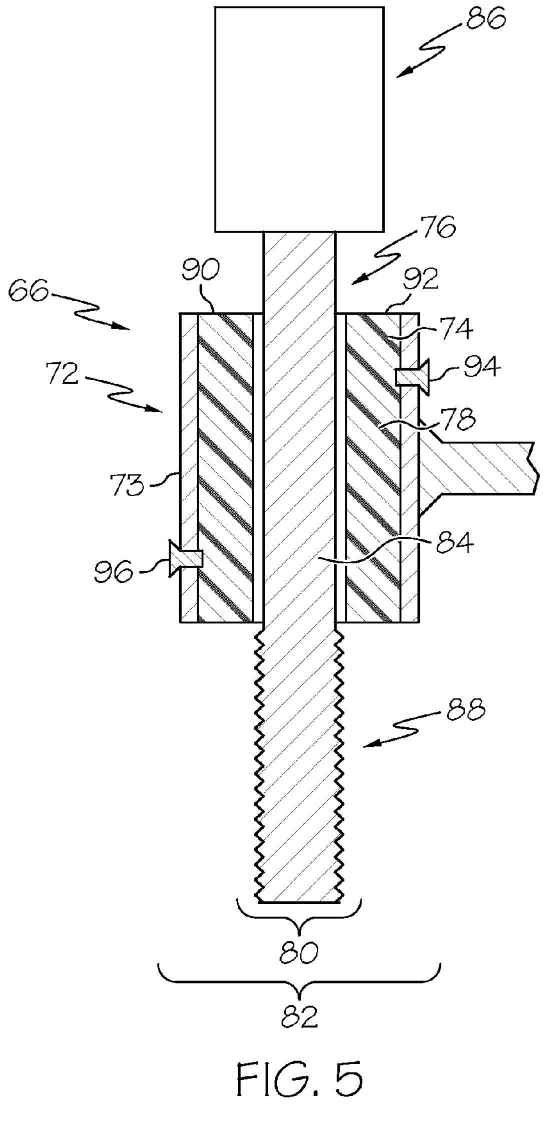
FIG. 5 is a section view of a support assembly for use with the tool protection device of FIG. 1.

Referring to FIG. 5, the support assembly 66 includes a tubular body 72 defining a sidewall 73 of the support assembly 66. The support assembly 66 may include a bearing adapter 74 that is sized to rotatably receive a rotating shaft of the tool 76. In some embodiments, the bearing adapter 74 may include a tubular body 78 having an inner diameter 80 and an outer diameter 82. The outer diameter 82 may be sized to fit in the tubular body 72, while the inner diameter 80 may be sized to fit around a shaft 84 of the tool 76. In some embodiments, the inner diameter 80 may be a dimension that is smaller than a cross-sectional dimension of a tap holder portion 86 and a threaded portion 88 of the tool 76. This arrangement can prevent unintended removal of the tool 76 from the bearing adapter 74 during use. When the tool protection device 10 is used with a tap as the tool 76, it may be referred to as a tap protection device. While the inner diameter 80 and the outer diameter 82 are illustrated as being substantially constant, the diameters 80 and 82 may vary along the length of the bearing adapter 74. Additionally the inner diameter of the support assembly 66 may vary to mate with the outer diameter 82 of the bearing adapter 74. In some embodiments, the bearing adapter 74 may be split into two or more pieces (e.g., along lines 90 and 92 to facilitate locating the tool 76 within the bearing adapter 74. Once the tool 76 is located in the bearing adapter 74, the tool 76 and bearing adapter 74 may be placed within the tubular body 72. In some embodiments, set screws 94 and 96 may be provided to fasten and fix the bearing adapter 74 within the tubular body 72 such that the tool 76 can rotate relative to the bearing adapter 74 and the tubular body 72.

Referring back to FIG. 1, once the tool 76 and bearing adapter 74 are received by the tubular body 72 of the support assembly 66, the handle 14 may be used to position the tool 76 at a desired location (e.g., at a hole to be tapped, for example, on a vehicle). Once positioned, the handle 14 extends substantially orthogonal to a tapping axis A that is defined by the axis of rotation of the tool 76. As can be seen, the tapping axis A is also offset laterally from a swivel axis S that is defined by the swivel assembly 18. In some instances, a manual tapping device may be connected to the tool 76 at the tap holder portion 86, which is used to rotate the tool 76. In other instances, a power-operated tapping device may be connected to the tool 76 at the tap holder portion 86, which is used to rotate the tool 76.

Figure 6:
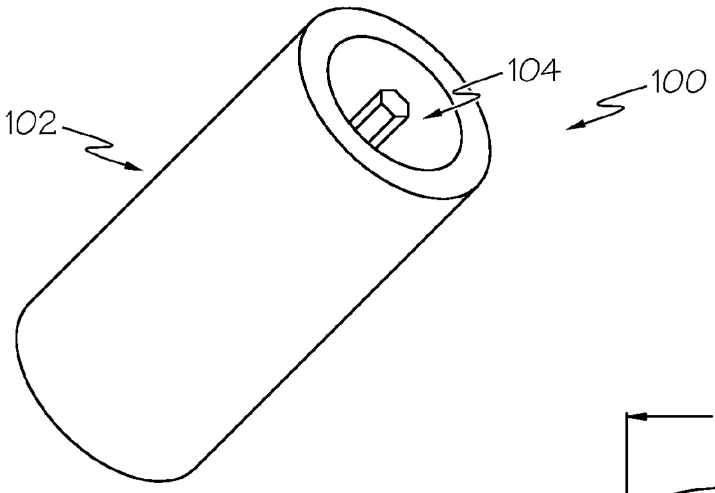
FIG. 6 illustrates another embodiment of a tool protection assembly according to one or more embodiments described herein.

While the above tool protection device 10 is a somewhat offset configuration (i.e., the gripping location is offset from the tapping axis A), FIG. 6 illustrates another embodiment of a tool protection device 100 having a somewhat in-line configuration where the gripping location is about the tapping axis. Referring to FIG. 6, the tool protection device 100 generally includes a housing body 102 and a tool assembly 104 slidably and rotatably received in the housing body 102.

Figure 7:
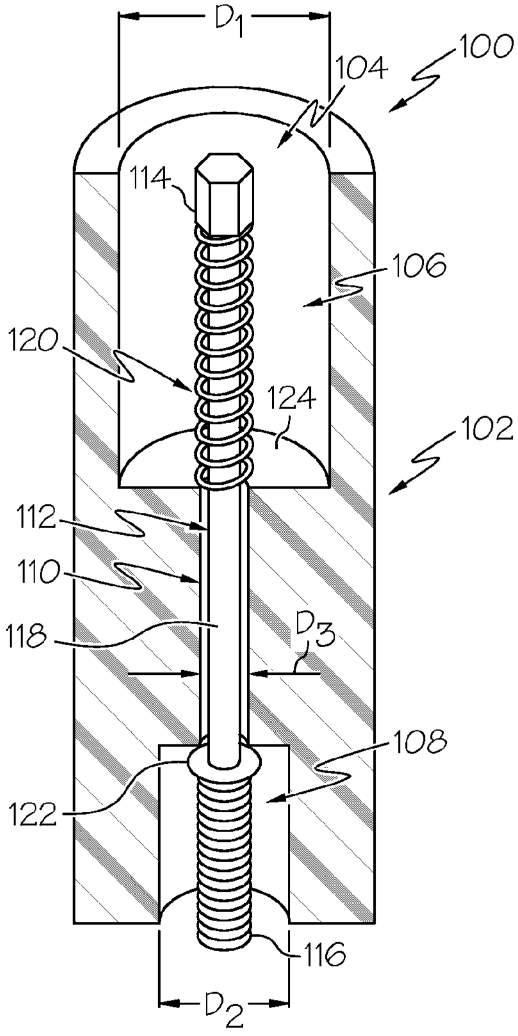
FIG. 7 illustrates a section view of the tool protection assembly of FIG. 6 according to one or more embodiments described herein.

Referring to FIG. 7, in one exemplary embodiment, the housing body 102 includes a first end bore 106, a second end bore 108 and an interconnecting bore 110 that connects the first and second end bores 106 and 108. In the illustrated embodiment, the first end bore 106 has a diameter $D_1$ that is greater than diameters $D_2$ and $D_3$ of the second end bore 106 and the interconnecting bore 110, respectively. $D_3$ of the interconnecting bore 110 may have the smallest dimension.

The tool assembly 104 generally includes a tool 112, a tool holder 114 and a tap portion 116 that is separated from the tool holder 114 by an elongated shaft 118. The tool holder 114 may be releasably connected to the elongated shaft 118, for example, using a threaded connection. A spring 120 or other biasing member is located beneath the tool holder 114 and a washer 122 is located above the tap portion 116.

To assemble the tool protection device 100, the tool holder 114 may be removed from the elongated shaft 118. The washer 122 may then be received over the elongated shaft 118 such that the washer 122 rests against the tap portion 116. The washer 122 may have an inner diameter that is less than a maximum width of the tap portion 116 yet greater than a width of the elongated shaft 118. The outer diameter of the washer 122 may be larger than $D_3$ of the interconnecting bore 110. An end opposite the tap portion 116 may then be received by the second end bore 108, the interconnecting bore 110 and then into the first end bore 106. The spring 120 may then be slid over the elongated shaft 118. The spring 120 may have a maximum width that is greater than $D_3$ of the interconnecting bore 110 such that the spring can rest against a seating surface 124 of the first end bore 106. The tool holder 114 may then be connected to the elongated shaft 118, as illustrated, thereby completing assembly of the tool protection device 100.

Figure 8:
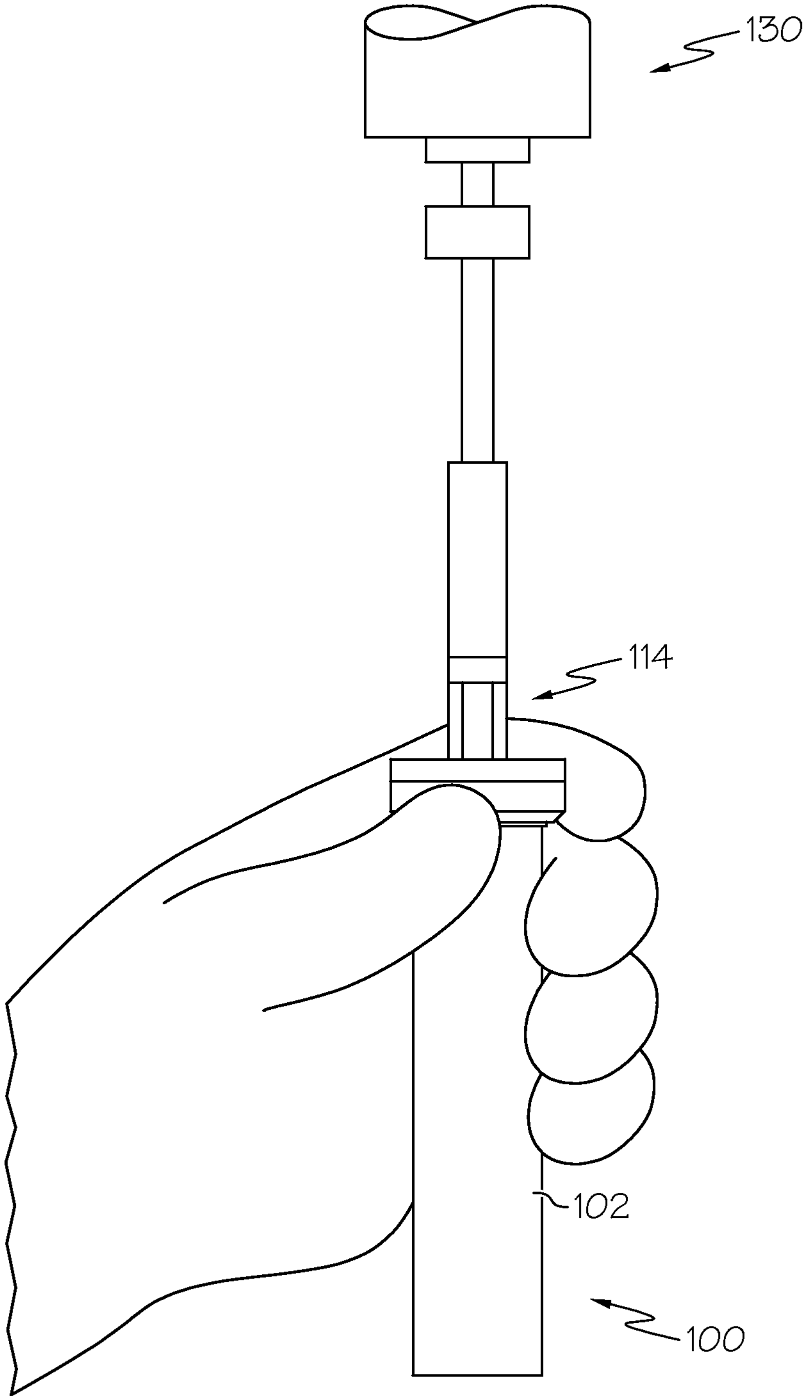
FIG. 8 illustrates the tool protection assembly of FIG. 6 in a disengaged configuration according to one or more embodiments described herein.
Figure 9:
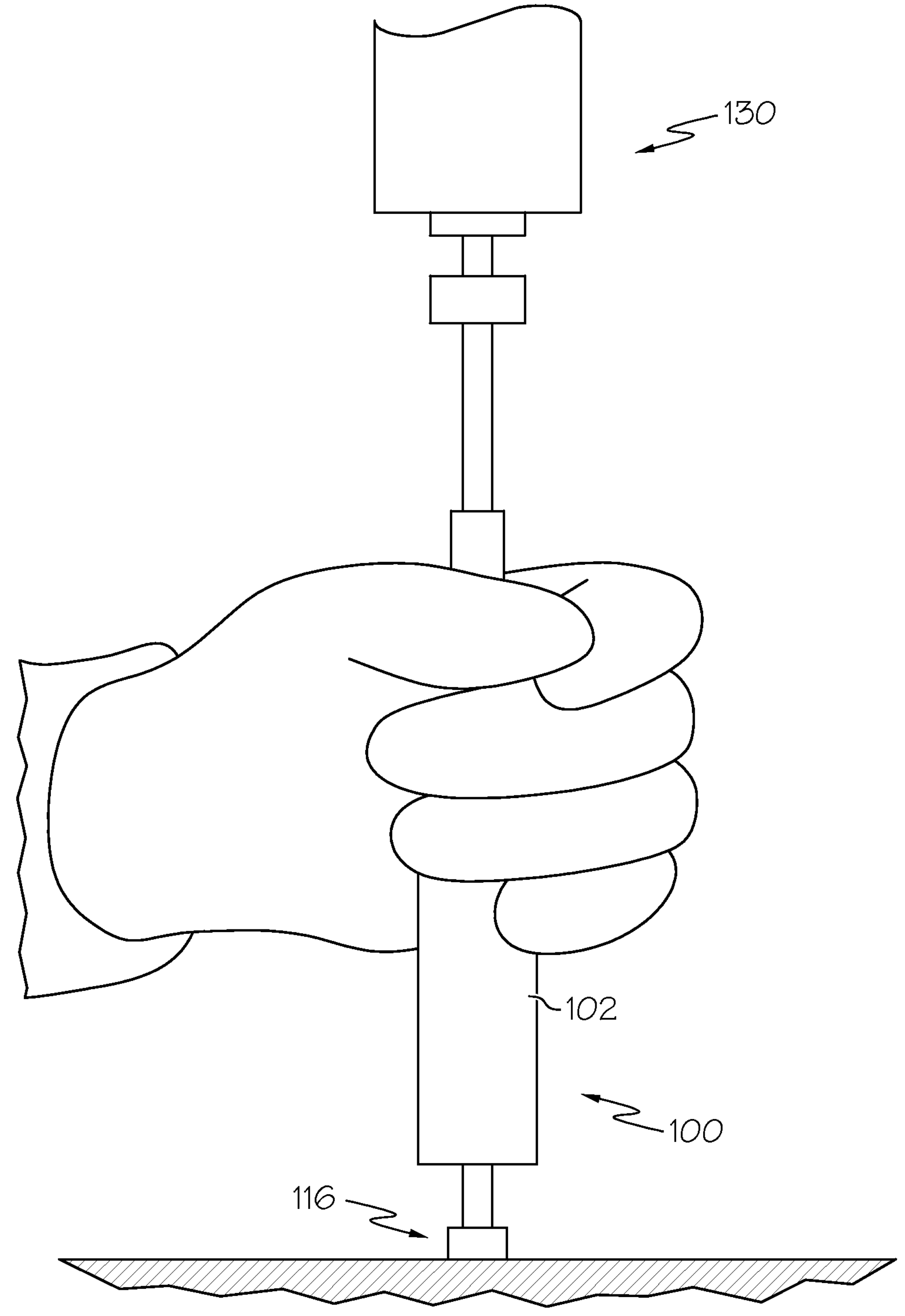
FIG. 9 illustrates the tool protection assembly of FIG. 6 in an engaged configuration according to one or more embodiments described herein.

In some embodiments, the tool protection device 100 may be used with an elevated tapping machine 130 that is suspended on a overhead fixture, for example. When the tool protection device 100 is used with a tap, it may be referred to as a tap protection device. As shown in FIG. 8, the tap portion 116 is retracted within the housing body 102 when the tapping machine 130 is disengaged from the tool 112. Referring to FIG. 9, when the tapping machine 130 engages the tool holder 114, the tap portion 116 may be extended below the housing body 102 for a tapping operation. The bias provided by the spring 120 biases the tool 112 toward the retracted position once the tapping machine 130 is disengaged from the tool 112.

The above-described tool protection devices can be used in guiding the tapping tool to the area being tapped and can be used to isolate the operator's hands and clothing from the rotating tool during use. The tool protection devices may be formed of any suitable material such as plastics and/or metals and using any suitable process such as molding, machining, etc. Use of the tool protection devices may reduce instances of misalignment during a tapping process, which can reduce instances cross-threading and resulting manufacturing delays.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A hand-held tool protection device comprising:

a handle sized and configured to be grasped by an operator;

a neck portion extending outwardly from the handle in a direction of an elongated axis of the handle;

a swivel assembly connected to the neck portion, the swivel assembly comprising:

a body having a top, a bottom and a sidewall extending between the top and the bottom, the body being connected to the neck portion at the sidewall of the body at a location between the top and the bottom;

an opening extending through the body and intersecting the top and the bottom of the body;

a pivotable rod member slidably and pivotably received in the opening extending through the body to provide a pivot axis; and a tool element holding assembly that is connected to the pivotable rod member such that the tool element holding assembly pivots therewith about the pivot axis, the tool element holding assembly comprising a support assembly configured for receiving a tool such that the tool may be rotated about a tool rotation axis.

2. The tool protection device of claim 1, wherein the tool rotation axis is substantially parallel to the pivot axis.

3. The tool protection device of claim 2, wherein the support assembly orbits about the pivot axis as the tool element holding assembly pivots about the pivot axis.

4. The tool protection device of claim 3, wherein the pivot axis is substantially perpendicular to the elongated axis of the handle.

5. The tool protection device of claim 1 further comprising a bearing adapter mounted within the support assembly.

6. The tool protection device of claim 5 further comprising a tool mounted within an opening of the bearing adapter.

7. The tool protection device of claim 6, wherein the tool is a tap.

8. The tool protection device of claim 5, wherein the support assembly is offset vertically from the elongated axis of the handle.

9. The tool protection device of claim 1, wherein the pivotable rod member includes a locking structure that is configured to lock the pivotable rod member at one of a plurality of angular positions.

10. A hand-held tap protection device comprising:

a handle sized and configured to be grasped by an operator;

a neck portion extending outwardly from the handle in a direction of an elongated axis of the handle;

a swivel assembly connected to the neck portion, the swivel assembly including pivot structure having a pivot axis located in an opening through a body having a top, a bottom and a sidewall extending between the top and the bottom, the body being connected to the neck portion at the sidewall of the body at a location between the top and the bottom; and a tool element holding assembly that is connected to the pivot structure such that the tool element holding assembly pivots therewith, the tool element holding assembly comprising a support assembly configured for receiving a tap such that the tap may be rotated about a tool rotation axis.

11. The tap protection device of claim 10, wherein the tool rotation axis is substantially parallel to the pivot axis.

12. The tap protection device of claim 10, wherein the support assembly orbits about the pivot axis as the tool element holding assembly pivots about the pivot axis.

13. The tap protection device of claim 10, wherein the pivot axis is substantially perpendicular to the elongated axis of the handle.

14. The tap protection device of claim 10 further comprising a bearing adapter mounted within the support assembly.

15. The tap protection device of claim 10, wherein the support assembly is offset vertically from the elongated axis of the handle.

* * * * *